United States Patent [19]

Fennema

[11] Patent Number: 4,839,876
[45] Date of Patent: Jun. 13, 1989

[54] TRACK SEEKING USING A TRACK FOLLOWING LOOP

[75] Inventor: Alan A. Fennema, Tucson, Ariz.

[73] Assignee: International Business Machines Corporation, Armonk, N.Y.

[21] Appl. No.: 123,675

[22] Filed: Nov. 23, 1987

[51] Int. Cl.⁴ ............................................ G11B 7/085
[52] U.S. Cl. ........................................ 369/32; 369/44
[58] Field of Search ...................... 369/32, 33, 44–46, 369/43; 358/342; 360/78

[56] References Cited

U.S. PATENT DOCUMENTS

| | | | |
|---|---|---|---|
| Re. 32,051 | 12/1985 | Ceshkovsky et al. | 369/44 |
| 2,843,841 | 7/1958 | King et al. | 340/173 |
| 3,473,164 | 10/1969 | Jensen | 340/173 |
| 3,480,919 | 11/1969 | Jensen et al. | 340/173 |
| 4,217,612 | 8/1980 | Matla et al. | 360/78 |
| 4,613,963 | 9/1986 | Hirano | 369/44 |
| 4,659,972 | 4/1987 | Uchikoshi et al. | 369/32 |
| 4,701,898 | 10/1987 | Giddings | 369/32 |
| 4,731,771 | 3/1988 | Maeda et al. | 369/44 |
| 4,748,607 | 5/1988 | Nakane | 369/32 |

Primary Examiner—Donald McElheny, Jr.
Attorney, Agent, or Firm—H. F. Somermeyer

[57] ABSTRACT

An optical disk recorder includes a position servo control loop for causing a beam of radiation to faithfully follow a track on the disk, jump from a current track to an adjacent track or to a small number of tracks away from the current track. Operation of the position servo loop is altered by selectively reversing the phase of a differentiated position error signal and integrating the differentiated position error signal for comparison with a sawtooth signal for moving the beam of radiation from the current track to an immediately adjacent track under continuous position servo control. Upon reaching the adjacent track, the sawtooth signal returns to a reference potential for initiating track following. The servo error between the integrated differentiated position error signal and the sawtooth signal is sufficiently small such that relaxation of the sawtooth signal does not cause any significant perturbations in the positioning servo loop operation. A velocity long seek servo can be substituted for the position servo loop for more rapid long seeks.

11 Claims, 2 Drawing Sheets

4,839,876

TRACK SEEKING USING A TRACK FOLLOWING LOOP

FIELD OF THE INVENTION

The present invention relates to position control systems, particularly those position control systems being advantageously used with optical disk recorders.

BACKGROUND OF THE INVENTION

Both magnetic and optical disk recorders employ either a large plurality of concentric record tracks or a single spiraling record track. The tracks on optical disks are identified by any one of a plurality of surface configurations on the optical medium (disk). A common configuration is a disk-shaped medium having circularly concentric groove or a single spiral groove, for indicating the location of the record tracks. In both magnetic and optical disks recorders, means are provided for faithfully following an addressed one of the record tracks. When it is desired to scan a track other than a currently scanned track, a track seek operation is provided; that is, the track following is aborted and a track seek algorithm is employed. Such seeking generally uses an algorithm which causes the effective disconnection of the track following operation.

In the past, when optical disk transducers were moved from a current track to an immediately adjacent track, that one track seek was colloquially referred to as track jumping. Such track jumping was often used for creating stop motion of video signals recorded on an optical disk. One of the recurrent problems of track jumping, as well as multiple track seeks, is to quickly and faithfully move from the currently scanned track to the addressed or target track, whether it be the next adjacent track or several tracks from the current track.

Other track seek operations use a so called velocity loop for the track seek, then switch to a position loop for track following. Other systems provide for disconnecting the track following position loop and supply a bang bang servo set of pulses for jumping to an adjacent track in a so called open loop mode, i.e., the position error feed back is disconnected. Yet other algorithms employ a single servo loop for both track scanning (following) and track seeking.

The King et al., U.S. Pat. No. 2,843,841, shows an optical disk recorder employing phase encoded recording of binary data. King et al. used an open loop pulse for moving the electron beam from scanning a current track to scan an adjacent track. The open loop pulse deflects the beam toward the second adjacent track more than one-half way, whereupon the pulse is terminated. Then the track following position control system takes over and finishes the movement of the beam to the adjacent target track. King et al. in the position controlling loop effect track following using a so-called grey scale. The data tracks are radially spaced apart on the disk with alternate opaque and transparent track position indicators lying between the data tracks. The data track bits on one side of either an opaque or transparent strip are called upsticking bits, while the bits in a track on the other side of the opaque or transparent strips are called downsticking bits. When the position loop is scanning the upsticking bits, then a reduction of light indicates that the beam is too close to an opaque strip in a first or down direction. However, when the beam is scanning the second track on the opposite side of the opaque strip, then a reduction in light indicates a track deviance in an up or opposite direction. Accordingly, when the beam is moved from one side of an opaque strip to the other side, the sense of the position error track following loop is reversed. The same procedure is followed in switching from a track over a transparent strip. The operation of track jumping in King et al. finds the open loop pulse moving the beam more than half way between the two adjacent tracks. Before termination of the open loop pulse, the sense of the track following loop is reversed. The track following position error signal has a one-half cycle of vibration when the beam is switched from a current track to an immediately adjacent track. The King et al. system appears to be satisfactory for relatively low track densities, but is not satisfactory for the higher track densities contemplated for the present day optical disk recorders.

An improvement over the King, et al. system is shown in U.S. Pat. Nos. 3,473,164 and 3,480,919 to Jensen et al. Rather than having concentric circular tracks as in King et al., Jensen shows a linear raster of tracks, but using the same data track configuration. With particular reference to FIG. 5 of U.S. Pat. No. 3,480,919, it is seen that the King, et al. open loop pulse is replaced by a clamping operation in a differential position error signal loop which forces the electron beam to move in one direction or another toward a second adjacent track. At the same time the clamping action is provided, the sense of the track following position sensing loop is reversed. When the electron beam is about halfway in its movement from the current track to an adjacent track, the clamping is removed. The track following loop completes the movement of the beam to the target adjacent track. This new arrangement provided for a more faithful jump from a current track to an adjacent track. However, the data format is the same and tends to limit the track density of the optical tracks; hence, it is not necessarily suitable for present day contemplated optical disks.

U.S. Pat. No. Re. 32,051 shows track jumping in a video recorder wherein the position error signal produced while traversing between two adjacent tracks is sinusoidal. The zero crossing of the sinusoid at the midpoint between the track causes termination of a jumping pulse. The jumping pulse disconnects the track following loop from an actuator, which in turn is reconnected after the beam has moved more than one-half way from the current track to the target adjacent track. Compensation pulses are provided at the terminous of the jump for reducing overshoot and beam settling time. In acquiring the tracking mode on the adjacent target track it is desired to provide a simpler, but more effective track jumping than provided by the reissue patent.

Hirano, U.S. Pat. No. 4,613,963 shows another open loop jumping circuit which requires a plurality of beams for achieving the open loop jump. It is desired that the use of a plurality of radiation beams be avoided when controlling track following and track seeking.

Matla in U.S. Pat. No. 4,217,612 shows a servo system which uses the same servo loop for both track following or scanning and track seeking. The command signal input into a scanner is changed to switch from track seeking to following. This arrangement will not work in systems not employing a simulator.

SUMMARY OF THE INVENTION

It is an object of the present invention to provide track traversing from one track to a second track while maintaining the operation of a track following loop by selectively altering the operation of loop.

A track following loop supplies a position error signal for facilitating track following within a position control loop. The position error signal goes through one cycle of vibration or alternation when a light beam controlled by the position error loop causes the beam to traverse from one track to an adjacent track. The position error signal is differentiated then integrated for supplying a control signal for both track seeking and following. A servo circuit during track following causes the loop to servo to a given reference potential, such as ground reference potential. For a traversal of the light beam from one to an adjacent track, a sawtooth command signal replaces the reference potential and has a polarity indicative of the direction of jump. The sawtooth signal causes the position servo control loop to move the radiation beam away from a current track toward an immediately adjacent track. The signal polarity of the differentiated position error signal is similar to the polarity of the sawtooth command signal during the first and last fourth of the position error signal vibration. The intermediate or central portion of the differentiated position error signal has its polarity reversed such that signal fed to the summer is derived from the position error signal that always has the polarity like that of the sawtooth command signal. Upon reaching the adjacent track, the sawtooth returns to ground reference potential. When a signal integrator generates the sawtooth signal, upon reaching a track center line, the integrated signal in such integrator is quickly discharged for removing the integrated signal from the servo loop. The operation of the loop is such that the error signal produced by the summer circuit during traversal between the tracks is kept relatively small such that insignificant, if any, transients are produced in the position servo loop by the sawtooth signal returning to ground reference potential.

Using the position servo loop for both following and track jumping, can be for moving from one track to an adjacent track or for stepping between a plurality of tracks, such with multiple sawtooth command signals (no limitation thereto intended), one command signal for traversing from one track to an adjacent track. The position servo loop can be advantageously employed for track seeking a relatively small number of tracks and be combined with a velocity loop for enabling seeking over a relatively large number of tracks.

The foregoing and other objects, features, and advantages of the invention will be apparent from the following more particular description of preferred embodiments of the invention, as illustrated in the accompanying drawings.

DESCRIPTION OF THE ILLUSTRATIVE EMBODIMENTS

Figure 1:
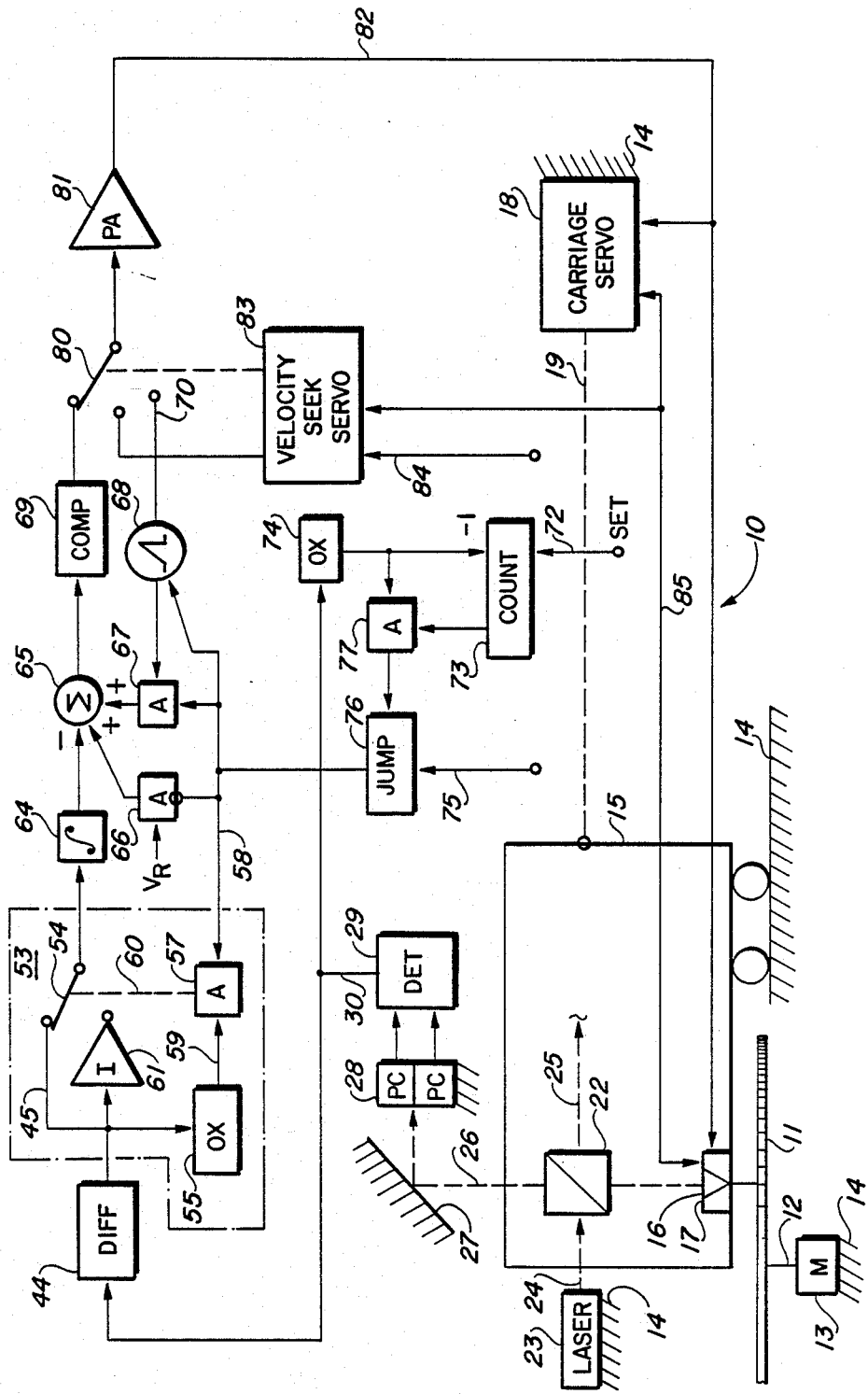
FIG. 1 is a simplified diagramatic showing of an optical disk recorder incorporating the teachings of the invention with that portion of the recorder illustrating the operation of the invention being accented and more complete than the showing of the remainder of the recorder.

Referring now to the appended drawing like numerals indicate like features and structural elements in the drawing. Optical disk recorder 10 records and reads signals on and from optical record disk 11. Disk 11 is mounted for rotation on spindle 12 of disk rotating motor 13. Motor 13 is operated at a constant angular speed; when video signals are recorded, motor 13 is operated at a constant track lineal speed on disk 11 irrespective of the radial position of the track. Recorder 10 has a frame diagramatically represented by numeral 14 for suitably mounting all of the components of the recorder. Carriage 15 is mounted on frame 14 for reciprocating radial motions with respect to a record surface of disk 11. Objective focusing lens 16 is mounted on the distal of carriage 15 for supplying a beam of radiation to disk 11 and for receiving a reflected beam of radiation from disk 11. Lens 16 is supported by a focus and tracking fine actuator 17 of usual design. Fine actuator 17 moves objective lens 16 perpendicular to the surface of disk 11 and along the axis of a light path for focusing operations, and moves the objective lens linearly radially for performing tracking operations and for causing the beam of radiation to move from a currently scanned track of disk 11 to a second track of disk 11. The second track may be the immediately radially adjacent track or may be separated by several intermediate record tracks. Carriage servo 18 mounted on frame 14 is mechanically coupled to carriage 15 as indicated by dash line 19. Carriage servo 18 controls the radial position of carriage 15, a later described position error servo loop which controls fine actuator 17, has its operation coordinated with that of carriage servo 18 so that carriage 15 tends to position itself for enabling the objective lens 16 to be centered in its range of radial movement with respect to disk 11.

The optics carried by carriage 15, which are in optical communication with lens 16, can be of the usual design. For purposes of brevity, beam splitter 22 is intended to represent all of the optics carried by carriage 15. Such optics may be those optics known for use with various forms of optical recording on disk 11. Such recording includes embossed recording, phase change recording, magneto optic recording, polymer dye recording and the like. Laser light source 23 mounted on frame 14 supplies a collimated light beam of radiation over light path 24 to optics 22. Optics 22 directs a portion of the light through objective lens 16 to disk 11 for recording and reading signals. The light reflected from disk 11 passes into optics 22, thence over light path 25 for data detection, focus detection and the like. A portion of the reflected light is transmitted over light path 26 to be reflected by mirror 27 to a pair of photo cells (PC) 28. The light travelling over path 26 contains track position indicating distortions of the reflected light beam as is known in the optical recording art. The photo cells 28 detect a difference in light intensity on one photo cell from another for indicating track following offsets, as is well known. Detector (DET) 29 receives electrical signals from PCs 28 for generating a position error signal (PES) which it supplies over line 30.

Position error signal (PES) 35 is representative of the output of detector 29 during traversal of the beam of radiation from the center of a current track being scanned 36 and an immediately adjacent track having centerline 37. PES 35 is shown as being sinusoidal and which is spatially related to the track centerlines 36 and 37. Please note that the signal 35 is not represented in the time domain. The servo pulse 38 results in a radiation beam radial velocity represented by velocity curve 39.

The operation of the track following position servo loop is next described together with the change in operation for achieving track jumping/seeking. Differentiator (DIFF) 44 receives PES 35 to supply a differentiated position error signal PES' 43 over signal line 45. PES' 43 has relatively negative polarity signal portions in the quarter portions of the intertrack systems between lines 36 and 37, which is a polarity suitable for comparing with a command signal for traversing the radiation beam to target adjacent track centerline 37. A central part 46 of PES' disposed between the quarter track points 56 has a signal polarity which when combined in the summer 65, as later described, tends to move that radiation beam back towards the current track. To avoid this problem, at the zero crossings 56 the polarity of the center portion 46 of PES' is reversed to appear as dash line 47. In this manner, all of PES' signal 43 positions between lines 36 and 37 have the same polarity.

To achieve the track traversing, servo command signal 48 in the shape of a sawtooth wave, is compared with PES' signal 43 (as integrated) in later described summer circuit 65. The resultant servo error signal resulting from combining signal 48 with modified signal 43 is represented by sawtooth signal 49. The switching of polarity at the quarter track points 56 results in minor perturbations 50 in the servo error signal. Suitable compensation in the position servo loop removes any negative effect of such perturbations.

Circuit 53 receives PES' and converts PES' 43 to a unipolar signal having the line 47 indicated phase reversal of the center portion of PES'. Electronic switch 54 switches the output signal of circuit 53 between PES' line 45 and an inverted PES' signal supplied by analog signal inverter 61 in synchronism with zero crossings 56. Synchronism is achieved by zero crossing circuit (OX) 55 generating output pulses in response to the zero crossings 56 which are supplied over line 59 to AND circuit 57. AND circuit 57 is enabled to pass the zero crossing pulses by an enabling (jump) signal, later described, received over line 58. AND circuit 57 controls electronic switch 54, as indicated by dash line 60, to move between the two illustrated terminals for selectively connecting analog inverter circuit 61 into the position control loop. Zero crossing detector 55 identifies all of the zero crossings of PES'. The AND circuit 57 under control of the jump signal on line 58 permits only two zero crossings 56 to pass to electronic switch 54 for switching to inverter 61. The second zero crossing actuates switch 54 to reconnect line 45 directly into the servo loop.

Switch 54 supplies PES' signal as selectively reversed to signal integrator 64. Integrator 64 supplies an error signal into analog summer 65. Summer 65 takes the later described reference signal and combines it with the error signal to supply servo position feedback signal 49 through the electronic switch 80; thence, power amplifier 81 over line 82 to fine actuator 17. The reference voltage VR, which may be ground reference potential, is continuously supplied over line 66 to summer 65. During track following the objective lens 16 is centered on a current track being scanned. When line 58 is carrying a jump signal, AND circuit 67 is enabled to pass the ramp generator 68 signal 48 to summer 65. Line 58 may be coupled to generator 68 for enabling the generation of repetitive servo ramp signals 48. At this point in time it should be noted that the polarity of the servo command signal 48 determines the direction of jump. A direction signal supplied over line 70 from a control unit (not shown) determines the direction of jump. Generation of such jump direction signals is so well known it will not be further discussed. The output of analog summer circuit 69 is supplied to compensation circuit COMP 69, which is a design using known position servo design techniques.

The generation of jump signal appearing on line 58 is next described. The first step is for the program control (not shown or described) to supply a count set signal over line 72 to counter COUNT 73. For a one track jump the counter is set to two. Once the counter 73 is set, then the program control supplies a jump initiate signal over line 75 to jump flip flop or bistable circuit 76. On being set, jump circuit 76 supplies the jump command signal over line 58, which initiates generator 68 supplying the servo command signal 48 to the summer 65 reference input, closes AND circuit 66 and opens AND circuit 67, and enables AND circuit 57 to pass zero crossing signal 56 to electronic switch 54. Zero crossing (OX) detector 74 responds to the zero crossings of PES signal 35 at the midpoint between center lines 36 and 37 and upon reaching line 37. Subtracting two from the numerical contents of counter 73 when counter 73 equals 0, and it supplies an AND circuit enabling signal to AND circuit 77 permitting the next occurring zero crossing signal (at center line 37) to pass to reset jump circuit 76 for removing the jump enabling signal from line 58.

The above description shows how a position servo loop used for track following is effectively and simply used for track jumping and for a plurality of track jumps for enabling short seeks to be successfully completed. Track seek mode switch 80 is selectively actuated to switch in the just described position servo loop or to use a velocity long seek servo, as next described.

Velocity seek servo 83 is initiated by receiving a seek command over line 84 from the program control using known techniques. Velocity seek servo 83 responds to the received command, which includes a number of tracks to be crossed for reaching a target track, to electronically control the switch 80 to switch from the just described position servo loop to the alternate terminal which couples the velocity seek servo 83 output signal to power amplifier 81. This signal also travels over line 82 to fine actuator 17. The velocity control signal on line 82 also travels to carriage servo 18 for moving carriage 15 on the long seek. Line 85 couples fine actuator 17 to carriage servo 18 for indicating the relative position of fine actuator 17 with respect to carriage 15 such that carriage servo 18 can respond for trying to center objective lens 16 at its midpoint of radial travel with respect to carriage 15. Operation of velocity servos are well known and not further described for that reason. An example of a two unit servo wherein one actuator is carried by the other and the carrying actuator follows the carried actuator (the fine actuator also called a topper actuator) is shown in expired U.S. Pat. No. 2,717,979. The supplying of address signals and switching between position track following and seeking modes is shown in the McIntosh, et al., U.S. Pat. No. 3,924,268.

Figure 2:
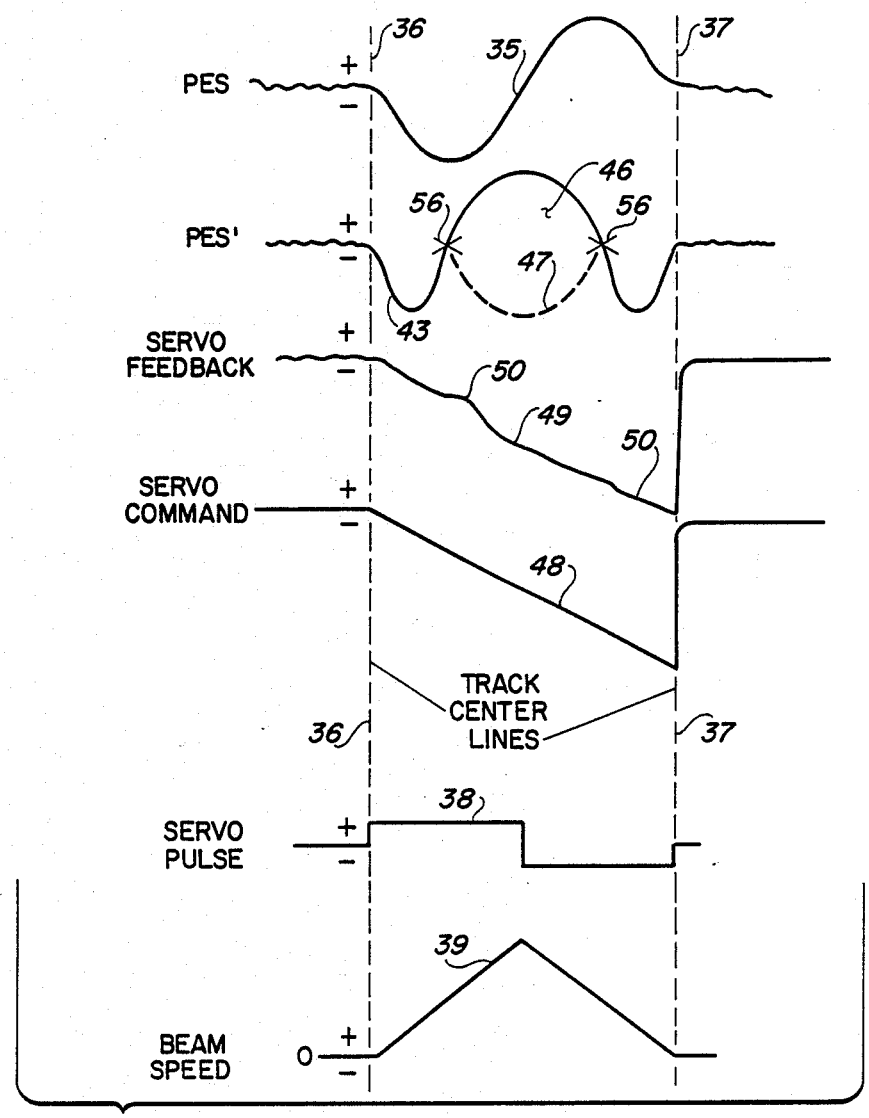
FIG. 2 is a set of graphs representing signals used to describe the operation of the FIG. 1-illustrated recorder.
Figure 3:
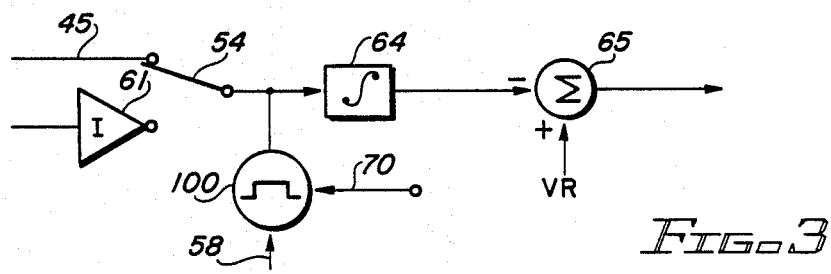
FIG. 3 illustrates a combined integrator and ramp generator usable in FIG. 1-illustrated recorder.

FIG. 3 illustrates a simplified circuit for generating a jumping control ramp signal. The control ramp is generated within integrator 64 rather than by a separate ramp circuit 68. Summer 65 continuously receives the reference voltage VR. Square wave generator 100 is actuated by the line 58 circuit to generate a square wave with a polarity indicated by the line 70 jump direction signal. The duration of the square wave is comparable to the duration of the ramp signal 48. This square wave is analog OR'd with the switch 54 tracking error signal at the input of integrator 64. Integrator 64 integrates the OR'd signal to output a pseudo error signal identical to signal 48 (FIG. 2) resulting in a drive signal output from summer 65 causing a jump. Subtracting the pseudo error signal from VR results in an identical drive signal as described for the ramp generator 68. Note that, because of the subtraction, for a given direction of track jumping the polarity of the square wave is opposite to the ramp signal 48. FIG. 3 is the preferred embodiment for the jump signal generation.

While the invention has been particularly shown and described with reference to its preferred embodiments thereof, it will be understood by those skilled in the art that various changes in form and details may be made therein without departing from the spirit and scope of the invention.

What is claimed is:

1. In a servo positioning system having motive means carrying an object to selectively position the object over one of any one of a plurality of spaced apart reference lines and having a position sensor for sensing and indicating the relative position of the object with respect to a closest one of the reference lines and supplying a position error signal indicative of the positional relationship of the object with respect to a closest one of said reference lines and supplying a sinusoidal signal alternation each time the object traverses a space between adjacent ones of the reference lines;

the improvement including, in combination:

command generator means for supplying a track reference signal for indicating keeping the object over a current one of the reference lines and a control reference signal of indicating a desired movement of the object from the current reference line to a second reference line spaced from the current reference line;

differentiating means connected to the position sensor for receiving the position error signal and differentiating the position error signal to create a differentiated error signal;

servo driver circuit means electrically interposed between said motive means, command generating means and the differentiating means for electrically coupling said differentiating means to said motive means for actuating the motive means to position the object with respect to the current reference line or a second reference line in response to the differentiated error signal and said reference signals;

zero axis crossing detecting means connected to said differentiating means for detecting and indicating the zero axis crossings; and phase change means in the differentiating means connected to the command generator means and to the zero axis crossing detecting means for responding to the indications of the zero axis crossings for reversing the phase of the differentiated error signal when the object is traversing between a current and a second reference line by reversing the polarity of the differentiated position error signal between the zero crossings thereof occurring intermediate the current and second reference lines and coupled to the servo drive circuit means for supplying the reversed phase signal thereto.

2. In the servo positioning system set forth in claim 1 further including, in combination:

said command generator means, including:

a jump signal means for supplying a jump command signal;

track counting means coupled to said position sensor for receiving said position error signal for counting the number of tracks traversed and for indicating arrival at a target track and coupled to said jump signal means for turning off the jump command signal;

a bi-polar control reference signal means coupled to said jump signal means and to said servo driver circuit means selectively capable of supplying positive and negative servo jump effecting signals and responsive to said jump signal means supplying a jump command signal to supply said servo jump effective signal to said servo driver circuit means;

said jump signal means being coupled to said phase change means for enabling same to reverse the phase of the differentiated error signal;

signal combining means in said servo driver circuit means connected to said command generator means and to said differentiating means for combining said differentiated error signal and said reversed phase signal with said jump command signals to generate a ramp-shaped servo drive signal for effecting the jumping of the object to said second reference line.

3. In the servo positioning system set forth in claim 2, further including in combination:

a square wave generator in the control reference signal means of the command generator means for generating a square wave signal to be said jump effecting signal;

an integrator in the servo driver circuit means coupled to the differentiating means for receiving said differentiated error signal and said reversed phase signal and coupled to the square wave generator for receiving the control reference signal for generating an integrated signal from the received signals;

a summer circuit in the servo driver circuit means coupled to the integrator for receiving said integrated signal and coupled to the command generator means for receiving said track reference signal and for combining same with said integrated signal for supplying a drive control signal for controlling said motive means; and means in the command generator means coupled to the square wave generator and to said phase change means for simultaneously actuating same for effecting a jump motion by the motive means.

4. In the servo positioning system set forth in claim 2, further including, in combination:

a ramp generator in said command generator means for generating said control reference signal as a sawtooth signal;

an integrator in the servo driver circuit means coupled to the differentiating means for receiving and integrating said differentiated error signal and said reversed phase signal to supply an integrated error signal;

tracking reference means for supplying a track reference signal for indicating a track following operation by said motive means;

a summer circuit in the servo driver circuit means coupled to the integrator for receiving the integrated signal and coupled to the command generator means and to said tracking reference means including the ramp generator for receiving said track and jump effecting reference signals for subtractively combining the integrated signal with said reference and jump effecting signals for generating a drive control signal for the motive means for controlling same; and means in the command generator means coupled to the ramp generator and to said phase change means for simultaneously actuating same for effecting a jump motion by the motive means.

5. In the servo positioning system set forth in claim 1, further including, in combination:

said phase change means comprising, in combination:
input means connected to said differentiating means for receiving the differentiated error signal;
an analog signal inverter having an input connected to said input means for receiving the differentiated error signal and having an output terminal;
an electronic switch having an output coupled to said servo driver circuit means and having first and second inputs respectively connected to said input means and to the output of said analog inverter and having a control input;
a zero crossing detector coupled to said input means for supplying an output signal each time the differentiated error signal has a zero access crossing; and
actuating means coupled to the input of said electronic switch for selectively actuating same between said inverter output and said input means and keeping the switch to said input means as a default setting and coupled to said zero access crossing detecting means for responding to a first zero access crossing signal to actuate the electronic switch to receive the signal from the inverter output and being responsive to the second received zero crossing signal to return the switch to said input means.

6. In the servo positioning system set forth in claim 5, further including, in combination:

said servo driver circuit means, including an integration circuit for receiving the differentiated error signal from the output terminal of the electronic switch;
an electronic analog summer circuit connected to said integrator for receiving the integrated differentiated error signal from said integration means;
said analog summer having a reference signal input connected to said command generator and being operative to compare the integrator means input with the reference input for supplying the servo drive signals; and
driver means coupled between said analog summer means and said motive means for converting the servo error signal into a positioning control signal.

7. In the servo positioning set forth in claim 6, further including, in combination:

said command generator means, including a sawtooth signal generator for generating a sawtooth signal as said jump effecting signal;
gating means electrically interposed between said signal reference source, said sawtooth generator and said summer means for selectively coupling either the reference signal or the sawtooth signal to said summer circuit means; and jump control means coupled to said gating means and to said phase change means for supplying a jump control signal whereby the phase change means selectively switches the electronic switch between the input means and the inverter output means at the differentiated error signal zero crossings and the gating means supplies the sawtooth signal to the analog summer means in place of the reference signal and means in the jump control means for terminating the jump control signal, said gating means responsive to the termination of the jump control signal for blocking the sawtooth signal from said analog summer means and replacing same with the reference signal.

8. In a data recorder having a rotatable disk for storing signals to be sensed and recorded, a carriage radially movable with respect to a recording surface on the disk, and having signal transducer means in transducing relationship to the recording surface, actuator means coupled to the transducer and carriage for positioning same radially of the disk and for causing the transducer means to faithfully follow a track on the disk and for faithfully changing tracks on the disk in response to commands, a position detector coupled to said transducer means for sensing the relationship of the transducer to a track being followed and to adjacent tracks during a track traversal mode of operation and supplying a position error signal indicative of the relative radial position of the transducer means to the tracks on said record disk, the position error signal being a sinusoid when traversing a track with a zero crossing of the sinusoid indicating such track crossing;

the improvement including, in combination:
signal differentiating means coupled to said position detector for receiving the position error signal and supplying a differentiated position error signal which is a first differential of the position error signal;
a signal integrator electrically coupled to the output of the signal differentiating means for receiving the differentiated position error signal and for supplying an output integrated error signal;
a voltage reference source supplying a reference signal;
a jump signal generator connected to the signal integrator for supplying a square wave to the integrator for integration with said error signals;
an analog summer circuit having first and second inputs, the first input being coupled to the signal integrator for receiving the integrated position error signal and the second input being coupled to said voltage reference source for receiving the reference signal, the summer circuit being subtractively responsive to the two signals for supplying a servo output error signal;
servo driver means coupled to the output of the analog summer and to said actuator means for positioning the signal transducer means in accordance with the combination of the reference signal and the integrated position error signal;
phase change means electrically interposed between the output of the signal differentiating means and the input of the signal integrator and being operative to supply a differentiated position error signal to the signal integrator; and jump control means coupled to said jump signal generator for causing the jump signal generator to supply the square wave to the signal integrator and coupled to the phase chance means for actuating the phase change means to supply the inverse of the differentiated position error signal between predetermined zero crossing of the differentiated signal during the time the transducer means is traversing from one track on the disk to an immediately adjacent jack on the disk wherein the signal reversal is in the middle one-half portion of the spacing between the adjacent tracks and means in the jump control means for terminating the jump signal when the adjacent track is reached.

9. The data recorder set forth in claim 8 wherein said transducer means is an optical system on the carriage, the transducer means, including an objective lens with a fine actuator controlled by the servo system for controlling a beam of radiation to impinge upon the record surface track in a predetermined manner with said position detector including optical means optically coupled to said carriage optics for receiving a beam of radiation reflected from the disk for detecting the relative position of the beam of radiation with respect to closely radially adjacent tracks on the disk;

said position detector supplying a single cycle of alternation in the position error signal whenever the transducer means traverses from a current track to an immediately adjacent track;

said signal differentiating means supplying a differentiated position error signal having zero crossings at quarter points of the intertrack spacing between two adjacent track centerlines on the disk; and said phase change means changing the phase of the differentiated position error signals intermediate to quarter track points each time the transducer means is traversing from one track to an adjacent track.

10. In the data recorder set forth in claim 9, further including means in said jump control means for actuating the servo system to successively jump a plurality of tracks.

11. In a method of operating an optical disk recorder, including moving an optical transducer from scanning one track on an optical medium to a second track on the optical medium and wherein the optical transducer supplies light having a track position indication parameter that varies in one cycle of vibration when traversing between adjacent track centerlines, including converting the light to an electrical position error signal;

the steps of:

establishing a command for moving the transducer from the one track to the second track, including in the command a sawtooth-shaped drive signal for actuating the transducer to traverse between adjacent ones of the tracks with the polarity of the drive signal indicating direction of traversal;

differentiating the position error signal;

actuating the recorder to move the transducer from the one track to the second track in a movement represented by the command signal;

processing the differentiated position error signal to reverse polarity of a portion of the position error signal generated while the transducer is transversing between two adjacent tracks; and combining the processed position error signal with the command signal to operate a servo system of the recorder for moving the transducer to the second track.

* * * * *